(12) United States Patent
Ohbitsu (10) Patent No.: US 8,171,212 B2
(45) Date of Patent: May 1, 2012

(54) DATA PROCESSING APPARATUS AND DATA PROCESSING PROGRAM STORAGE MEDIUM

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 12/457,260

(22) Filed: Jun. 4, 2009

(65) Prior Publication Data

US 2010/0031179 A1  Feb. 4, 2010

(30) Foreign Application Priority Data

Jul. 29, 2008  (JP) ................................. 2008-195290

(51) Int. Cl.
*G06F 12/00* (2006.01)
(52) U.S. Cl. ....................................... 711/111
(58) Field of Classification Search ........................ None
See application file for complete search history.

(56) References Cited

U.S. PATENT DOCUMENTS

| | | | |
|---|---|---|---|
| 5,949,953 A | 9/1999 | Shirakawa | |
| 6,473,569 B1 | 10/2002 | Shidate et al. | |
| 6,539,164 B2 | 3/2003 | Shirakawa | |
| 7,212,728 B2 | 5/2007 | Shirakawa | |
| 7,406,249 B2 | 7/2008 | Shirakawa | |
| 2001/0031132 A1 | 10/2001 | Shirakawa | |
| 2002/0044760 A1 | 4/2002 | Shirakawa | |
| 2005/0089312 A1 | 4/2005 | Shirakawa | |
| 2006/0114330 A1 | 6/2006 | Kuroiwa | |
| 2008/0062271 A1 | 3/2008 | Kuroiwa | |
| 2008/0062272 A1 | 3/2008 | Kuroiwa | |
| 2010/0073503 A1* | 3/2010 | Tanaka et al. | 348/222.1 |

FOREIGN PATENT DOCUMENTS

| | | |
|---|---|---|
| JP | 8-69373 | 3/1996 |
| JP | 2001-094844 | 4/2001 |
| JP | 2001-169167 | 6/2001 |
| JP | 2001-209545 | 8/2001 |
| KR | 10-0219748 | 9/1999 |

\* cited by examiner

*Primary Examiner* — Hiep Nguyen
(74) *Attorney, Agent, or Firm* — Staas & Halsey LLP (57) ABSTRACT

A data processing apparatus has a processing memory section that stores plural processing sections for building a combination processing section; a construction data memory section that stores construction data for building the same combination processing section as the latest combination processing section used for executing a series of processing of most recently input data; and a processing construction section that reads, at a timing before data to be processed is input, plural processing sections forming the same combination processing section as the latest combination processing section, based on the construction data and connects the processing sections in the same order of processing as in the latest combination processing section, thereby building the same combination processing section as the latest combination processing section.

4 Claims, 10 Drawing Sheets

| Block | Element | Input Source |
|---|---|---|
| Mpeg Stream Splitter | MPEG2 Demultiplexer | DVD |
| Mpeg Audio Decoder | Core AAC Audio Decoder | MPEG2 Demultiplexer |
| Direct Sonud Device | Sound Device No.1 | Core AAC Audio Decoder |
| Mpeg Video Decoder | Divx Decoder | MPEG2 Demultiplexer |
| Video Renderer | Renderer No.2 | Divx Decoder |

No data for reproduction for shortest time.
It takes ordinary time to produce moving image.

No filter for reproduction for shortest time.

OK

DATA PROCESSING APPARATUS AND DATA PROCESSING PROGRAM STORAGE MEDIUM

CROSS-REFERENCE TO RELATED APPLICATIONS

This application is based upon and claims the benefit of priority of the prior Japanese Patent Application No. 2008-195290, filed on Jul. 29, 2008, the entire contents of which are incorporated herein by reference.

FIELD

Embodiments discussed herein are related to a data processing apparatus and a data processing program storage medium.

BACKGROUND

With enhanced processing performance of a personal computer (hereafter referred to as a PC), a PC having the function of reproducing contents including animation data and sound data has spread in the market. Such a PC reproduces contents using various kinds of mediums typified by communication equipment and a disk.

Contents provided to a PC are subject to stepwise processing including filtering, compression encoding, and multiplexing. Processing at each stage is performed based on standards chosen depending on the characteristic of a medium and the quality of an animation image. Therefore, processing suitable for the contents needs to be performed sequentially in order to reproduce contents in a PC. For example, when the reproduction of contents is instructed in a PC, the header information of contents is read at first to acquire kinds of processing applied to the contents at each stage. Subsequently, a processing program corresponding to the acquired kind of the processing is installed so as to be executable, and the processing programs are set in a manner that data processed by one processing program is subject to processing by the other processing programs.

Incidentally, a digital camera that operates only a minimum number of programs at the time of starting processing (for example, refer to Japanese Laid-open Patent Publication No. 2001-209545) has been known as an example of electronic equipment that operates by selecting a different program depending on a kind of processing. This digital camera operates only the programs necessary for the selected operation mode.

When contents are reproduced in a PC, it takes time to select necessary processing programs among plural processing program candidates and to connect them in the order of processing. For example, particularly when contents with an image are reproduced to be displayed, it takes much time until the contents are provided to a user, which is a problem. The digital camera described in the above technique is not an exception, as it operates programs after necessary processing is determined by setting the operating mode and thus it takes time until processing result is obtained after the necessary processing is determined.

SUMMARY

According to a basic embodiment of a data processing apparatus that receives input of data and performs on the input data a series of processing by a combination processing section, the combination processing section being formed by connecting plural processing sections for sharing processing in the order of the processing, the plural processing sections having a different combination depending on a kind of data to be input, the data processing apparatus including:

a processing memory section that stores plural processing sections for building the combination processing section;

a processing execution section that performs on the input data a series of processing by the combination processing section, the series of processing being in accordance with the input data;

a construction data memory section that stores construction data formed by identification data and connection data for building a same combination processing section as a latest combination processing section that is used by the processing execution section for executing a series of processing of most recently input data, the identification data identifying plural processing sections forming the latest combination processing section, the connection data representing order of processing by the plural processing sections; and a processing construction section that reads, in response to a predetermined event that occurs at a timing before a timing when data to be processed is input, plural processing sections forming a same combination processing section as the latest combination processing section, from the construction data memory section based on the construction data stored in the construction data memory section, and that connects the plural processing sections in the same order of processing as in the latest combination processing section, thereby building the same combination processing section as the latest combination processing section, at the same time, in response to input of data to be processed, the processing construction section rebuilding a new combination processing section for executing a series of processing on the data to be processed, when a kind of the data to be processed is different from the kind of the latest data, wherein the processing execution section performs on the date to be processed the series of processing by the combination processing section that is built by the processing construction section.

According to a basic embodiment of a storage medium storing a data processing program that is executed by a computer and that causes the computer to operate as a data processing apparatus, the data processing apparatus receiving input of data and performing on the input data a series of processing by a combination processing section, the combination processing section being formed by connecting plural processing sections for sharing processing in the order of the processing, the plural processing sections having a different combination depending on a kind of data to be input, the computer operating as the data processing apparatus including:

a processing execution section that performs on the input data a series of processing by the combination processing section, the series of processing being in accordance with the input data;

a construction data memory section that stores construction data formed by identification data and connection data for building a same combination processing section as a latest combination processing section that is used by the processing execution section for executing a series of processing of most recently input data, the identification data identifying a plurality of processing sections forming the latest combination processing section, the connection data representing order of processing by the plural processing sections; and a processing construction section that reads, in response to a predetermined event that occurs at a timing before a timing when data to be processed is input, plural processing sections forming a same combination processing section as the latest combination processing section, from the construction data memory section based on the construction data stored in the construction data memory section, and that connects the plural processing sections in the same order of the processing as in the latest combination processing section, thereby building the same combination processing section as the latest combination processing section, at the same time, in response to input of data to be processed, the processing construction section rebuilding a new combination processing section for executing a series of processing on the data to be processed, when a kind of the data to be processed is different from the kind of the latest data, wherein the processing execution section performs on the date to be processed the series of processing by the combination processing section that is built by the processing construction section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Hereafter, detailed embodiments of a data processing apparatus and a data processing program storage medium according to the present invention will be described.

Figure 1:
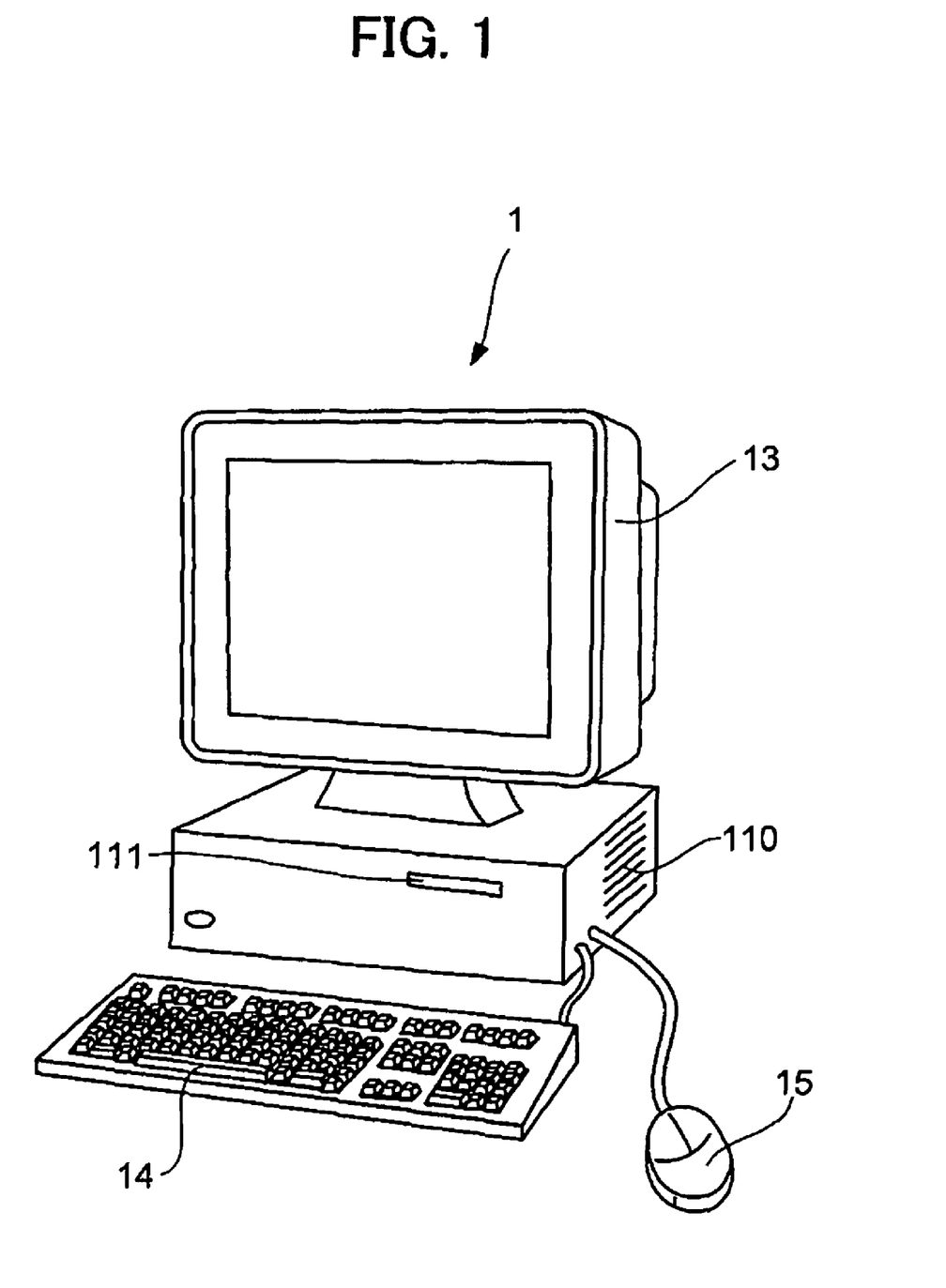
FIG. 1 is an external perspective drawing of a personal computer operating as one embodiment of a data processing apparatus.
Figure 2:
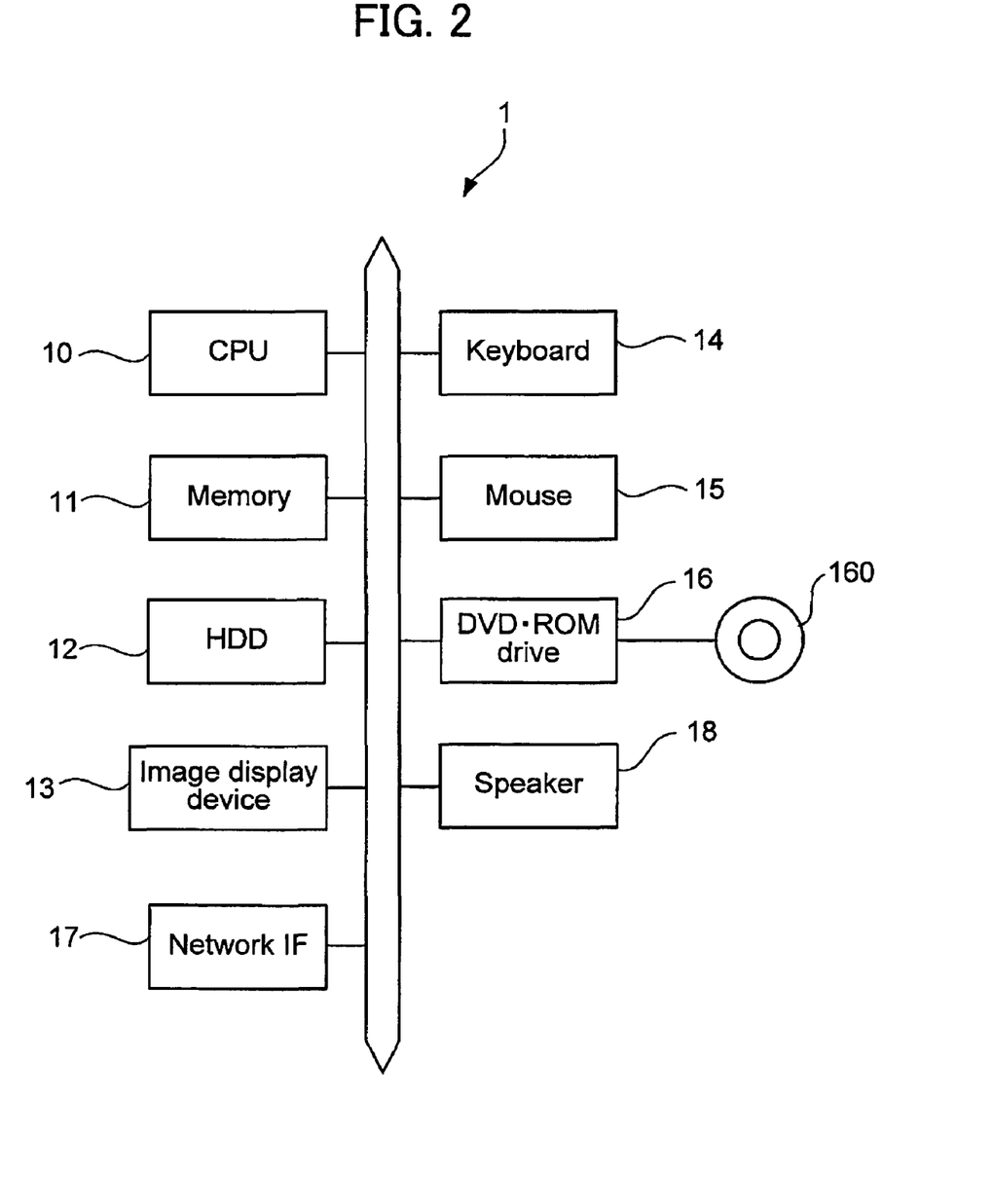
FIG. 2 is a drawing representing a hardware configuration of the PC.

FIG. 1 is an external perspective view of a personal computer (a PC) operating as one embodiment of a data processor. FIG. 2 is a drawing representing the hardware configuration of the PC depicted in FIG. 1.

A PC 1 depicted in FIG. 1 has a main unit 110 equipped with a CPU that will be described later, a memory, and a hard disk and the like, an image display device 13 for displaying an image on a display screen by an instruction from the main unit 110, a keyboard 14 and a mouse 15 serving as an operating section for inputting an instruction and character information in the PC 1 according to an operation of a user.

The main unit 110 has a DVD loading port 111 for loading a DVD (digital versatile disc) and a CD-ROM. The DVD loading port 111 has a DVD drive incorporated therein for driving a DVD and a CD-ROM loaded therein.

The main unit 110 has elements incorporated therein as depicted in FIG. 2, such as a CPU 10 for carrying out various programs, a memory 11 in which programs stored in a HDD 12 are read and expanded to be operated in the CPU 10, the HDD 12 in which various programs and data are saved, a DVD drive 16 for accessing a loaded CD-ROM 160 or DVD, and a speaker 18 for outputting a sound. These various elements, in addition to the image display device 13, the keyboard 14 and the mouse 15 that are also depicted in FIG. 1, are connected to one another. In addition, the PC 1 has a network IF (interface) 17 built therein for acquiring a processing program and contents through a LAN (local area network) or the Internet. The network IF 17 and the elements of the hardware configuration in the PC 1 are connected to one another.

The PC 1 acquires contents formed by image data and sound data to be processed, in response to operation of a user, through the network IF 17 or the DVD drive 16, and reproduces data to display the image data on the image display device 13 and to output the sound data from the speaker 18, and thereby providing contents to a user.

Hereafter, one embodiment of a data processing program will be described.

When, for example, a data processing program is recorded in the CD-ROM 160, the CD-ROM 160 is loaded in the main unit 110 from the DVD loading port 111 and the data processing program recorded in the CD-ROM 160 is installed in the HDD 12 of the PC 1 by the DVD drive 16. Further, when the data processing program installed in the HDD 12 is started, the PC 1 operates as one embodiment of the data processing apparatus.

Figure 3:
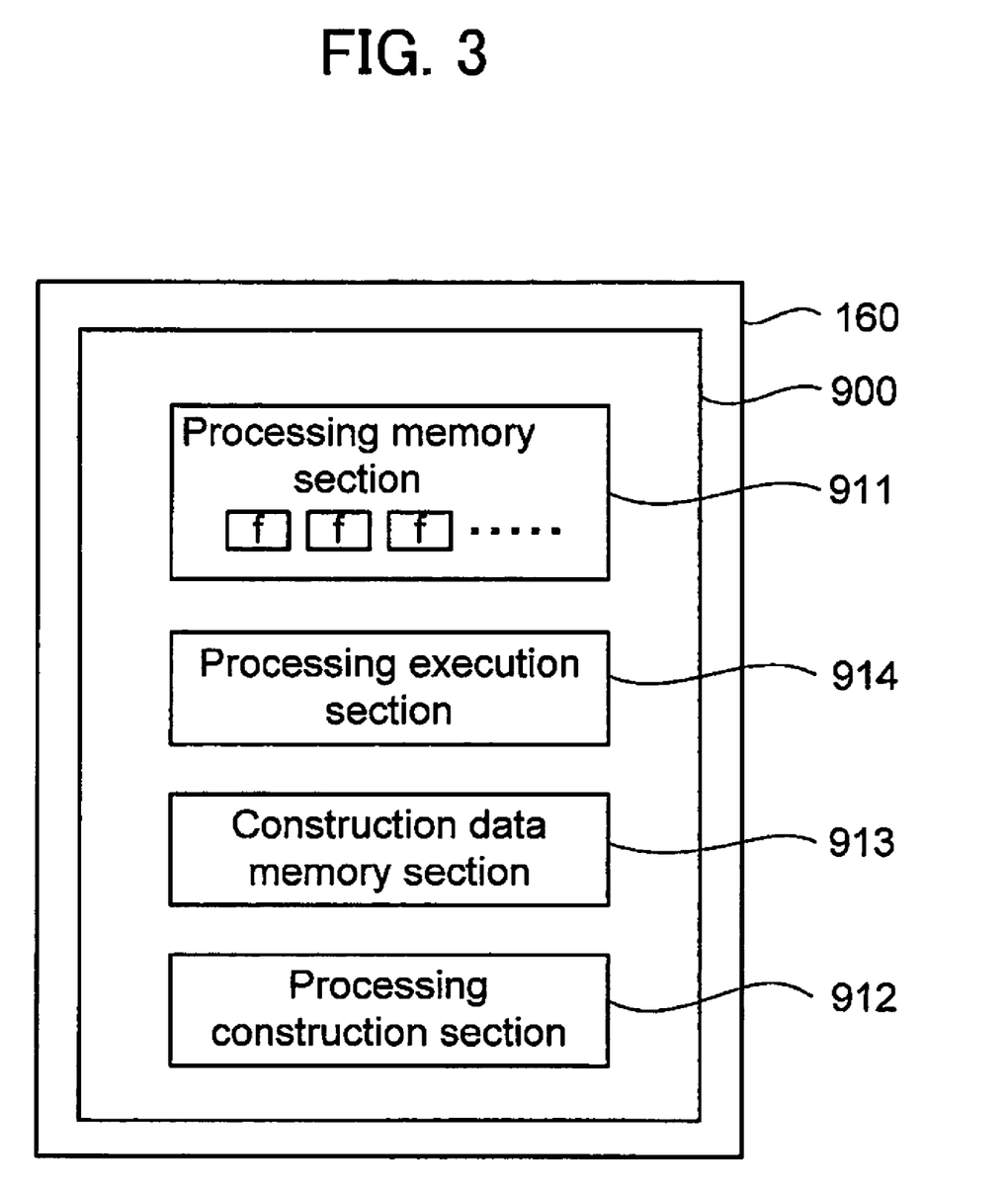
FIG. 3 depicts one embodiment of a data processing program.

FIG. 3 depicts one embodiment of the data processing program.

In the embodiment, a data processing program 900 is stored in the CD-ROM 160. The data processing program 900 may be recorded in the HDD 12 depicted in FIG. 2 or other recording medium such as a DVD, a FD, and a MO (unshown) as well as the CD-ROM 160 depicted in FIG. 3.

The data processing program 900 depicted in FIG. 3 is executed in the PC 1 depicted in FIG. 1 and FIG. 2 and thereby causes the PC 1 to operate as a data processing apparatus. The data processing program 900 includes a processing memory section 911, a processing construction section 912, a construction data memory section 913 and a processing execution section 914. The details of the elements of the data processing program 900 will be described later.

Figure 4:
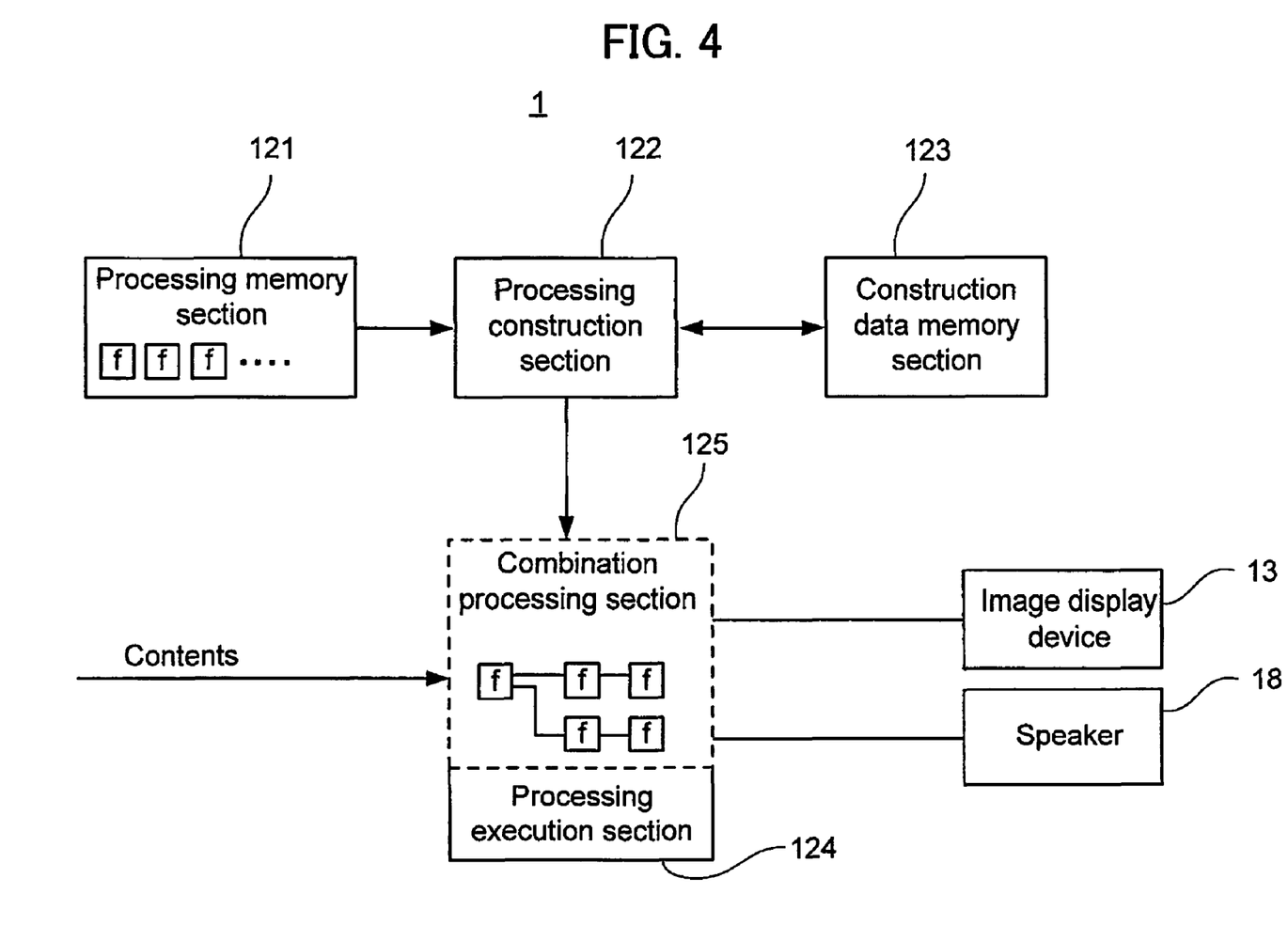
FIG. 4 is a schematic diagram of elements that are built for operating the PC depicted in FIG. 1 and FIG. 2 as one embodiment of the data processing apparatus.

FIG. 4 is a schematic diagram of elements that are built for operating the PC depicted in FIG. 1 and FIG. 2 as one embodiment of the data processing apparatus.

When the data processing program 900 depicted in FIG. 3 is installed in the PC 1 depicted in FIG. 1 and FIG. 2, a processing memory section 121, a processing construction section 122, a construction data memory section 123 and a processing execution section 124 depicted in FIG. 4 are built in the PC 1.

The processing memory section 121, the processing construction section 122, the construction data memory section 123 and the processing execution section 124 are built in the PC 1 respectively by the processing memory section 911, the processing construction section 912, the construction data memory section 913 and the processing execution section 914 of the data processing program 900 depicted in FIG. 3. The PC 1 reproduces contents acquired through the Internet or a DVD and the like.

A combination processing section 125 is a block in which plural filters fs for sharing processing according to input contents are connected in the order of the processing. The combinations of plural filters are different depending on the kind of the input contents.

Plural filters fs for sharing processing of contents reproduction are stored in the processing memory section 121. The details of the filter f will be described later.

The processing construction section 122 reads filters fs stored in the processing memory section 121 and connects the filters fs in the order of processing of reproducing contents and thereby constructs the combination processing section 125.

Plural filters fs are stored in the processing memory section 121 to construct the combination processing section 125. The plural filters fs are stored at each of stages sharing the processing, depending on the kind of contents to be reproduced. Each filter f is capable of inputting and outputting data and is a function block that processes input data. More concretely, the filter f is a program. Here, the filter corresponds to an example of the processing section according to the basic embodiment described above.

Figure 5:
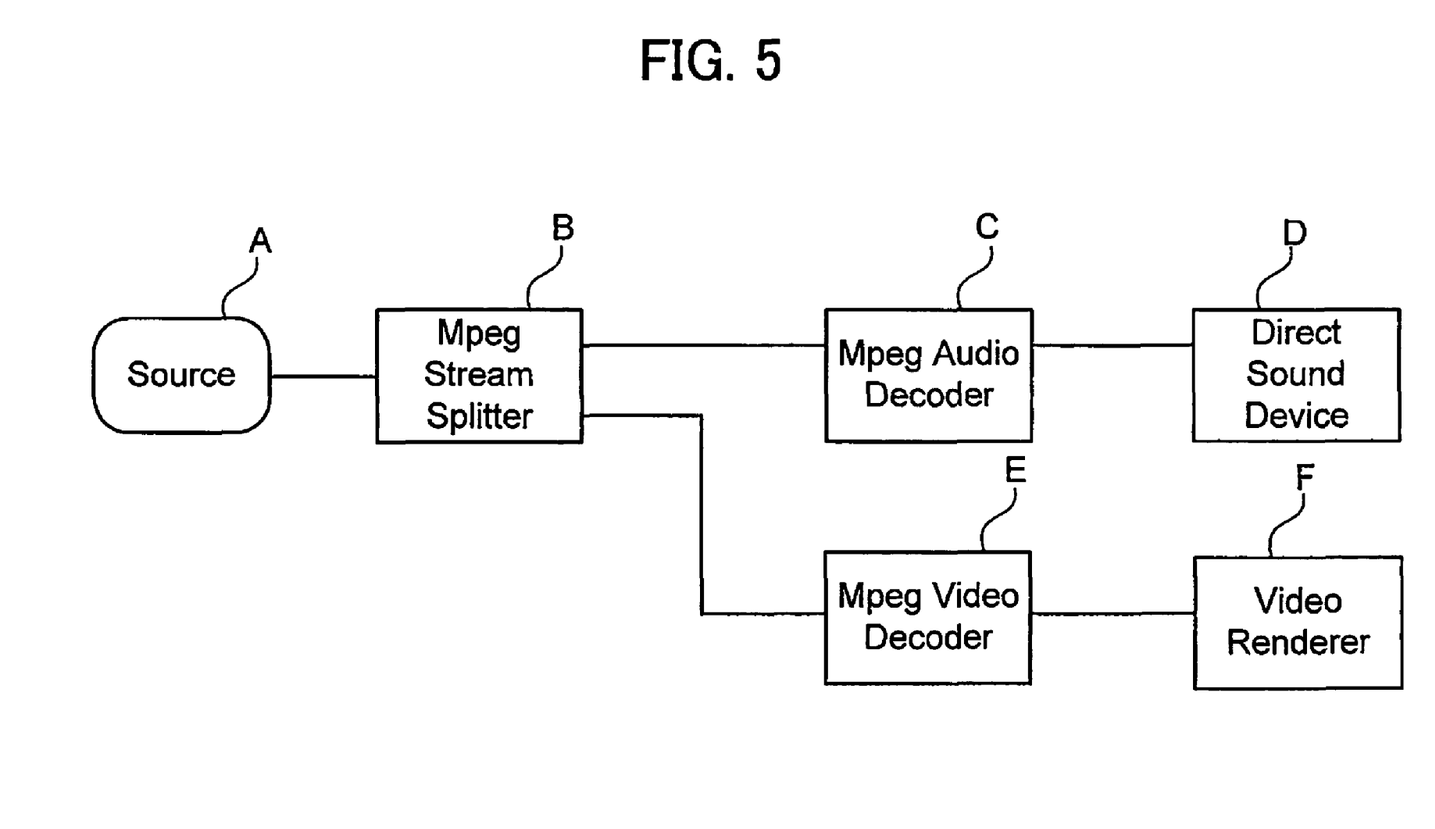
FIG. 5 is a block diagram depicting a series of processing for contents reproduction.

FIG. 5 is a block diagram depicting a series of processing for reproducing contents.

A splitter (Mpeg Stream Splitter) B, an audio decoder (Mpeg Audio Decoder) C, a direct sound device (Direct Sound Device) D, a video decoder (Mpeg Video Decoder) E and a video renderer (video renderer) F respectively correspond to examples of processing stages. It should be noted that another series of processing different from those in FIG. 5 may be employed depending on the kind of contents to be processed. For example, processing of subtitle data and TV program data or processing in accordance with decoding processing of encrypted data may be added, or only audio processing without image processing may be employed.

In the example depicted in FIG. 5, the contents, i.e., data output by a source A, are input to the splitter B. The input data are separated into image data and audio data by the splitter B and output respectively to the audio decoder C and the video decoder E. The audio decoder C decodes input data and outputs it to the direct sound device D. The direct sound device D performs processing such as volume control and equalizer for input data and outputs processed data to the speaker 18 (see FIG. 3). On the other hand, the video decoder E decodes the input data and outputs it to the video renderer F. The video renderer F performs complementary processing and rendering processing and outputs processed data to the image display device 13 (see FIG. 3).

The plural filters that are candidates for processing at each stage are stored in the processing memory section 121. For example, the candidates for splitter B include a wav format parser for processing a wav format and a MPEG2 demultiplexer for processing a MPEG2 format. The candidates for the video decoder E include a Divx decoder for processing a Divx format and a real video decoder for processing a real video format. The candidates for the audio decoder C include a CoreAAC audio decoder for processing an AAC format and a MPEG layer 3 decoder for processing a MP3 format. The candidates for the direct sound device D include sound devices Nos. 1-2, and the candidates for the video renderer F include renderers No. 1-2.

The processing construction section 122 selects a filter among the plural filter candidates, for example at each processing depicted in FIG. 5 and connects the selected filter, thereby constructing the combination processing section 125. More specifically, the processing construction section 122 selects a filter f corresponding to the certain kind of contents and reads the filter f from the processing memory section 121 and develops the filter f in the memory 11 (see FIG. 2) so that the filter f can be executed by the CPU 10. The processing construction section 122 also performs setting of input and output of plural selected filters in a manner that data acquired by processing of one filter f is subject to processing by the other filter f.

The processing execution section 914 performs a series of processing in the combination processing section 125. Specifically, the processing execution section 914 executes each of filters fs that are elements of the combination processing section 125. The construction of the combination processing section 125 by the processing construction section 122 is based on construction data stored in the construction data memory section 123 or header information included in the contents to be processed. The construction data memory section 123 is formed by non-volatile storage devices such as the hard disk 12 (see FIG. 2) and stores construction data for constructing the same combination processing section 125 as the combination processing section used for processing the contents input most recently. In addition, the kind of the contents input most recently is also stored in the construction data memory section 123 as part of construction data.

Figure 6:
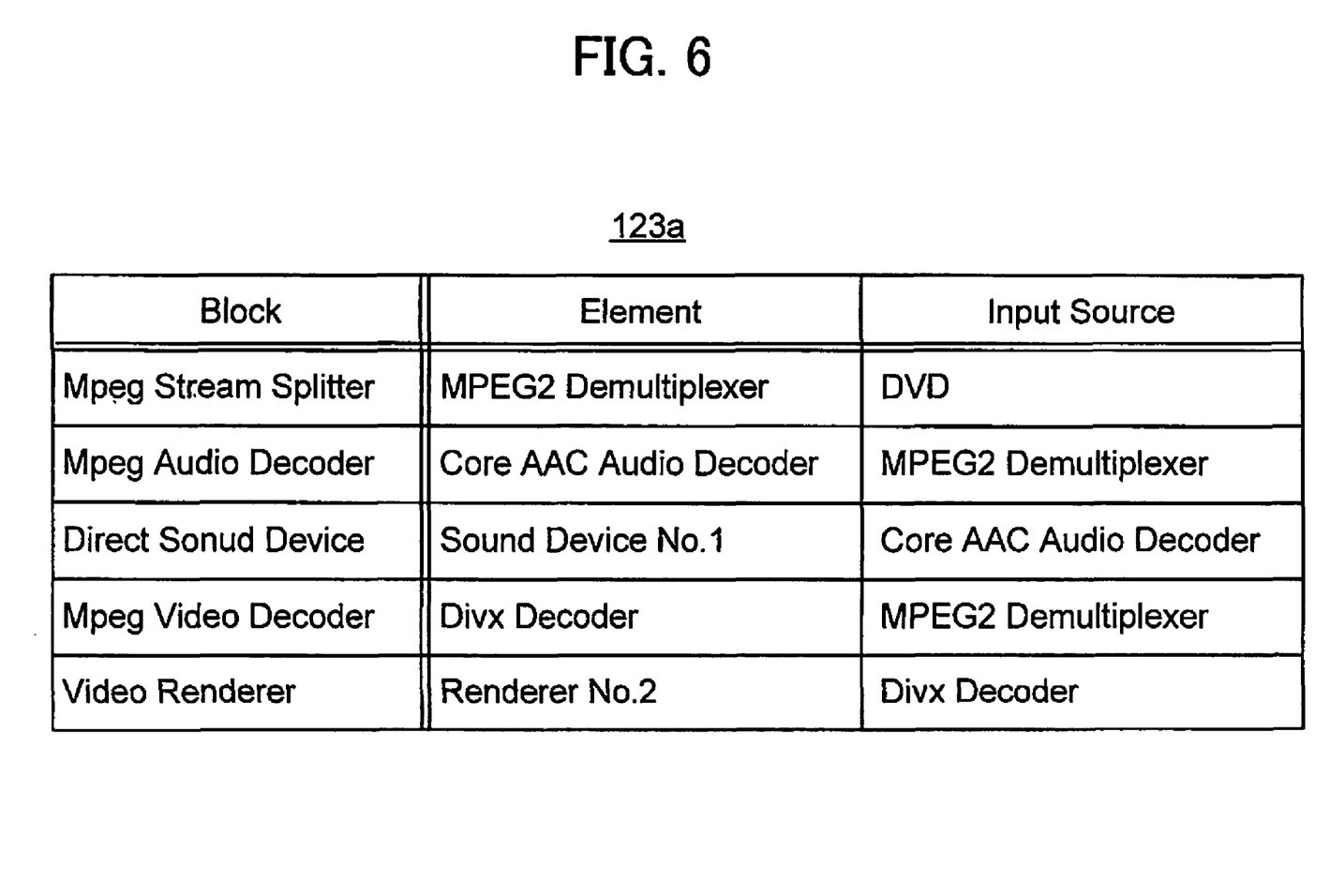
FIG. 6 depicts an example of construction data stored in the construction data memory section.

FIG. 6 depicts an example of construction data stored in the construction data memory section Construction data stored in the construction data memory section 123 includes, for example as depicted in FIG. 6, identification data of filters used for the contents input most recently and for connection of the filters. In the example of construction data 123a depicted in FIG. 6, the name of the MPEG2 demultiplexer is stored as identification data of a filter functioning as a stream splitter. In addition, the name of the CoreAAC audio decoder is stored as identification data of a filter functioning as an audio decoder. Similarly, the names of the Sound device No. 1, Divx decoder, and Renderer No. 2 are stored respectively as filters functioning as a direct sound device, a video decoder, and a video renderer. In addition, the name of each filter indicates the kind of data that the filter can process. The construction data also includes connection data, i.e., input source of each filter or where each filter acquires input data. For example, the name of the MPEG2 demultiplexer is stored as the input source of the CoreAAC audio decoder. This means that output data of the MPEG2 demultiplexer is used as input data of the CoreAAC audio decoder. Namely, the input of the CoreAAC audio decoder is connected to the output of the MPEG2 demultiplexer. It should be noted that the input source of the stream splitter indicates the kind of contents input most recently. Here, as DVD is described as the input source of the stream splitter, the kind of contents input most recently is a DVD (DVD-video). Kinds of contents other than a DVD may include, for example, digital broadcasting, a video CD, a karaoke CD, and a wav file.

Hereafter, data conversion processing by the PC 1 will be described using a flow chart.

Figure 7:
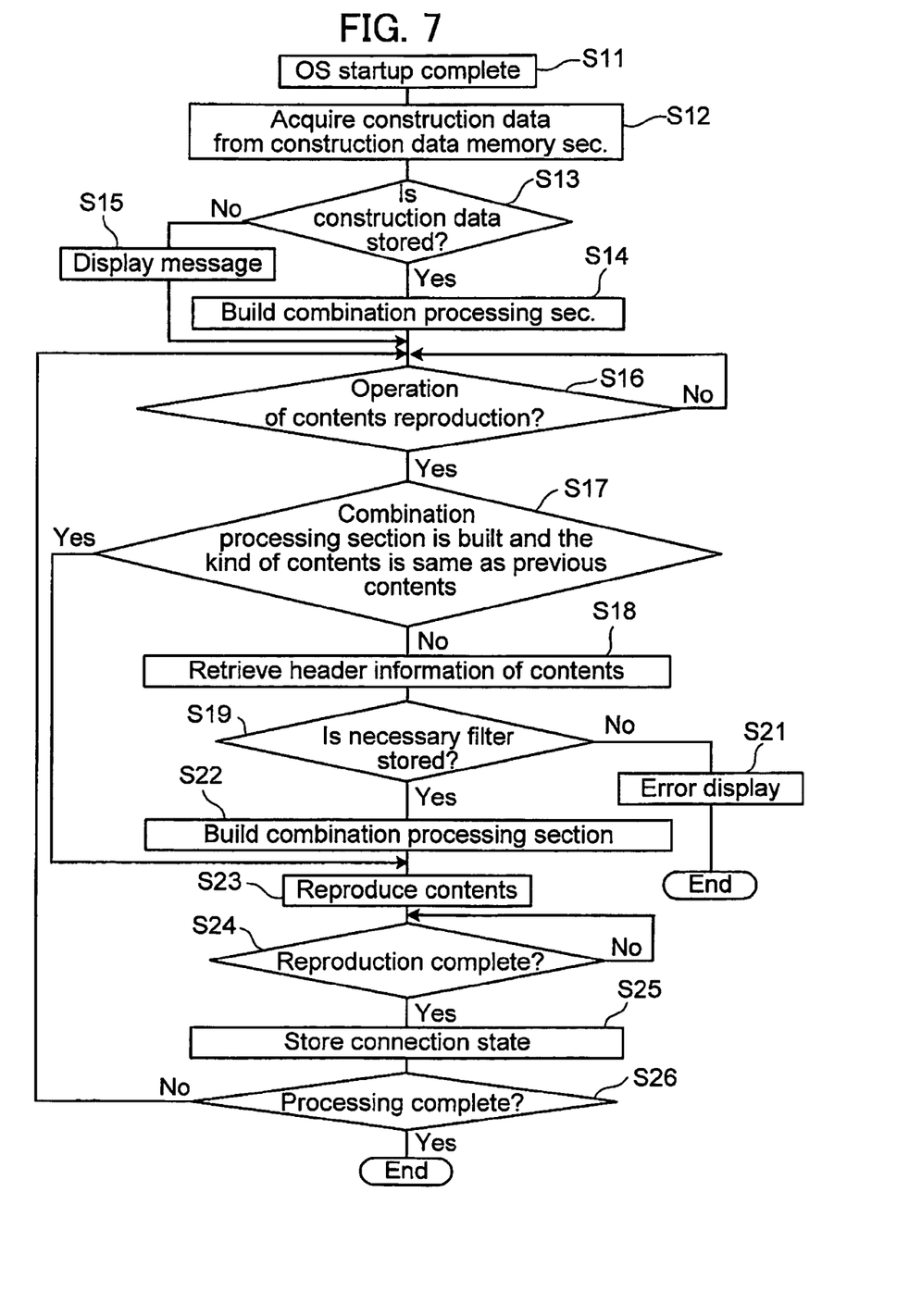
FIG. 7 is a flow chart depicting operation of the data conversion processing by the PC.

FIG. 7 is a flow chart depicting operation of the data conversion processing by the PC.

The operation of data conversion processing starts at a timing when the PC 1 is turned on or startup of the OS by reboot is completed (step S11).

At first, the processing construction section 122 acquires the construction data 123a from the construction data memory section 123 (step S12). When the construction data 123a is stored in the construction data memory section 123 (step S13: Yes), the processing construction section 122 constructs the combination processing section 125 based on the construction data 123a (step S14). In step S14, the processing construction section 122 reads, from the processing memory section 121, plural filters for forming the same combination processing section as the past combination processing section 125, and connects the plural filters in the same processing order as in the past combination processing section 125, and thereby constructs a combination processing section 125 same as the past combination processing section 125. It should be noted that the past combination processing section 125 represents the one used for performing a series of processing of the past data that is input most recently.

Figure 8:
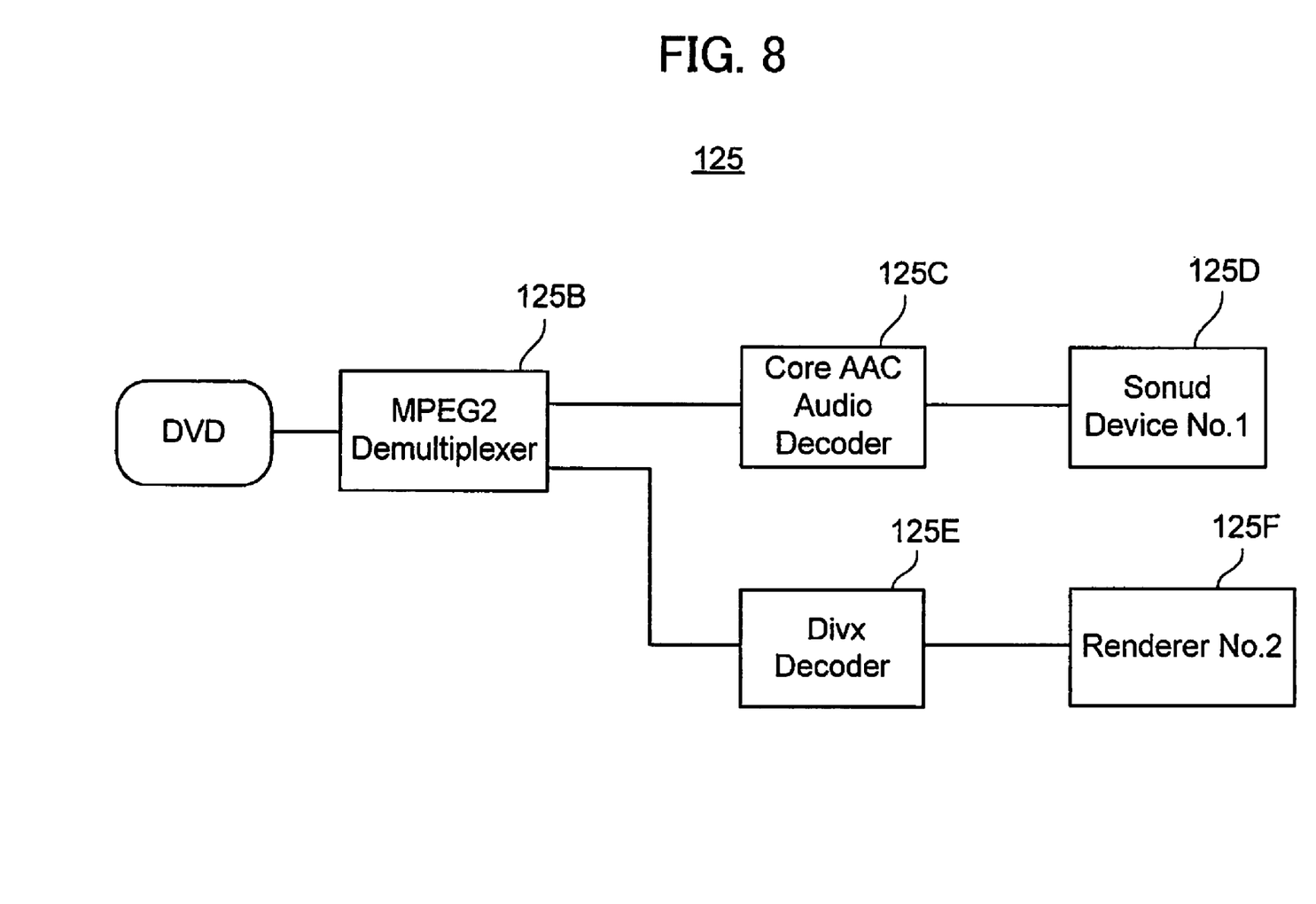
FIG. 8 is a block diagram depicting an example of a combination processing section that is constructed based on the example of the construction data depicted in FIG. 6.

FIG. 8 is a block diagram depicting an example of a combination processing section constructed based on the example of the construction data depicted in FIG. 6.

For example, if contents of a DVD loaded in the DVD drive 16 (see FIG. 2) have been processed in the PC 1 before shutdown of OS, a combination processing section 125 that can process contents of the DVD is constructed as depicted in FIG. 8 based on the construction data 123a after the startup of the OS. In the example depicted in FIG. 8, a MPEG2 demultiplexer 125B as a stream splitter is connected with a CoreAAC audio decoder 125C as an audio decoder and with a Divx decoder 125E as a video decoder. In addition, the CoreAAC audio decoder 125C is connected with a sound device No. 1 (125D) as the direct sound device, and the Divx decoder 125E is connected with a renderer No. 2 (125F) as a video renderer.

As described above, the combination processing section 125 is constructed in response to completion of the OS startup that is a timing earlier than when the contents to be reproduced are input. Thus, time taken until contents is reproduced and displayed will be shorter compared with the case where a combination processing section is constructed based on header information after the contents are input.

Referring back to FIG. 7, when the construction data 123a is not stored in the construction data memory section 123 (step S13: No), the processing construction section 122 judges that that the PC 1 is in a state just after the factory shipment or that the construction data was erased by special processing such as the initialization for a program setting, and omits processing for constructing the combination processing section 125. In this case, the processing construction section 122 causes the image display device 13 to display a message indicating that it takes time to start processing of contents. This message informs a user in advance that it takes time until contents reproduction is started after an operation to instruct contents reproduction is made.

Figure 9:
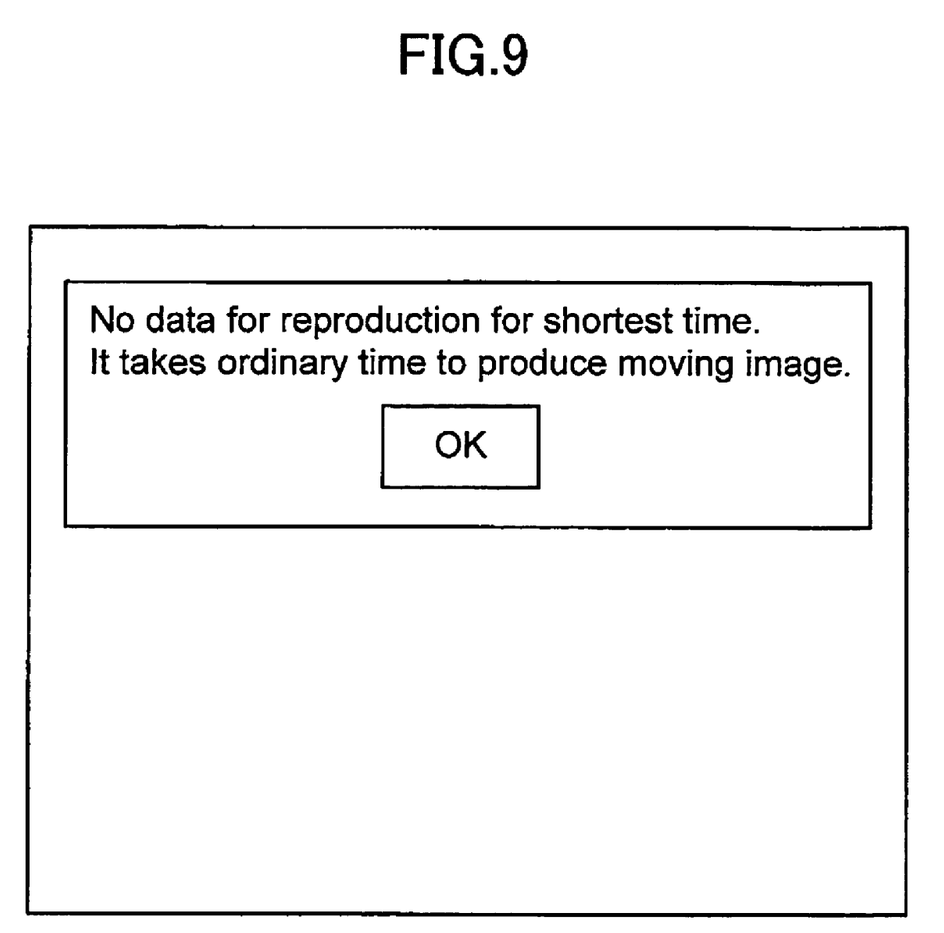
FIG. 9 is an example of a message displaying that it takes time until processing is started.

FIG. 9 is an example of a message displaying that it takes time until processing is started.

"Ordinary time" in the message of FIG. 9 represents the time taken until contents starts to be reproduced and displayed by the combination processing section 125 after the contents are input and the combination processing section 125 is constructed based on the header information.

Referring back to FIG. 7, descriptions will continue. When operation of contents reproduction by a user is received using the mouse 15 or the keyboard 14 (step S16: Yes), the processing construction section 122 judges if the combination processing section 125 is already constructed and the contents specified by the reproduction operation is of the same kind as the contents that was reproduced last time (step S17). More specifically, it is judged if the kind of contents specified by operation of contents reproduction matches that of the contents input most recently and stored in the construction data memory section 123. If in step S17 it is judged that the combination processing section 125 is not constructed or the kind of contents is different from that of the contents reproduced most recently (step S17: No), the processing construction section 122 reads the header information of contents (step S18) and judges based on the header information whether a filter necessary for processing the contents is stored in the processing memory section 121 (step S19). When reproduction of the contents is not arranged in the PC 1 and therefore the filter necessary for processing the contents is not stored in the processing memory section 121 (step S19: No), an error message is displayed to end the processing (step S21) because it is impossible to construct the combination processing section 125 corresponding to the contents.

Figure 10:
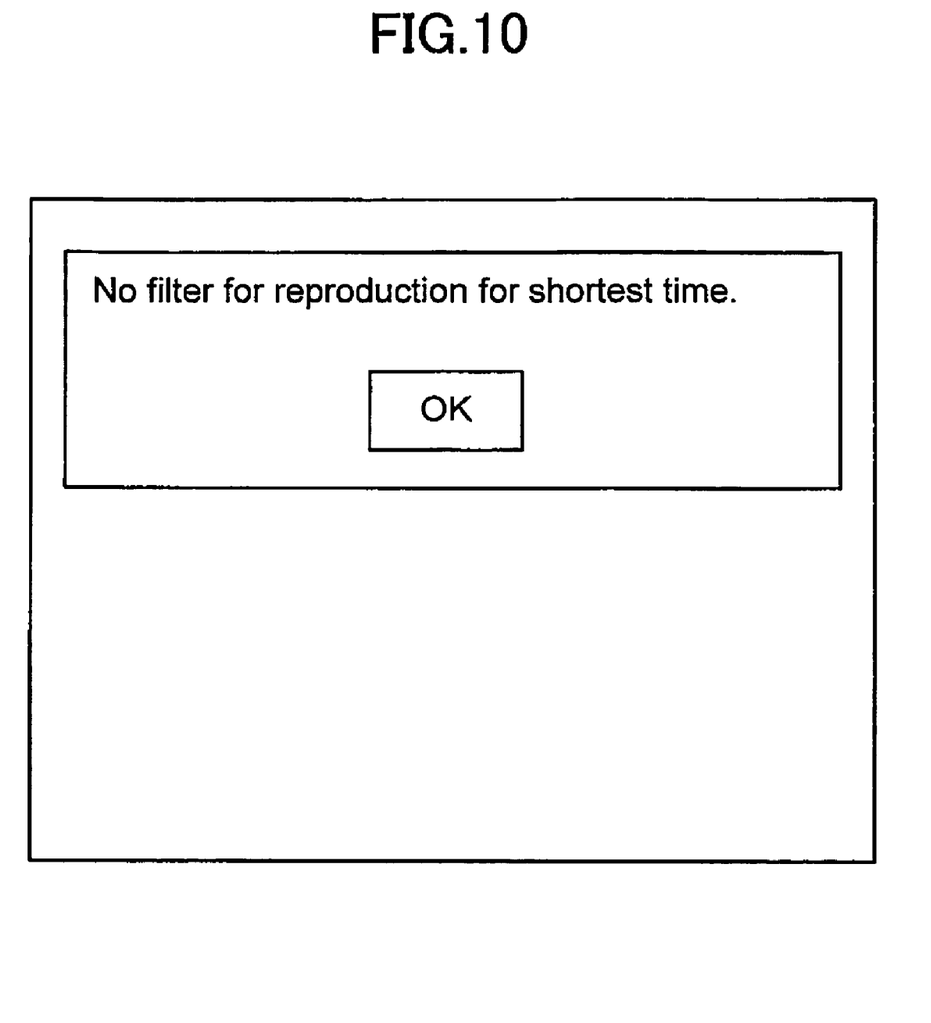
FIG. 10 is an example of an error message displayed when there is no filter necessary for processing contents.

FIG. 10 is an example of an error message to be displayed when there is no filter necessary for processing contents.

Referring back to FIG. 7, descriptions will continue. When the filter necessary for processing contents is stored in the processing memory section 121 (step S19: Yes), the processing construction section 122 constructs, based on the header information of the contents that is read in step S18, a new combination processing section 125 that performs a series of processing of the contents to be processed this time (step S22) This allows reproducing a new kind of contents that is transmitted, for example, via the Internet through the network IF 17 (cf. FIG. 2).

When at step S17 it is judged that the combination processing section 125 is already constructed and the kind of contents specified by the reproduction operation is the same as the one reproduced previously, procedures from steps S18 to S22 are omitted, which shortens the time taken until the contents is reproduced.

In the next step (step S23), reproduction of contents is performed. More particularly, the processing execution section 124 subjects the input data to a series of processing that forms the combination processing section 125. At this time, the processing execution section 124 causes each filter of the combination processing section 125 to start processing. For example, in the case where the combination processing section 125 is formed by connecting filters depicted in FIG. 8, the processing execution section 124 performs setting in such a manner that contents of a track to be actually reproduced is instructed as the pre-arranged input source of contents. This allows the instructed contents to be input, and the input contents are subject to a series of processing forming the combination processing section 125. Consequently, an image is displayed on the image display device 13, and sound is output from the speaker 18.

Subsequently, when the reproduction of contents is finished (step S24: Yes), the connection state is stored (step S25). In this step, the construction data memory section 123 stores the names of filters forming the current combination processing section 125 and the names of filters representing the respective input sources as new construction data 123. Thus, after startup of the OS next time, the construction data 123a having data identifying plural filters forming the combination processing section 125 and connection data indicating the processing order by the filters is stored in the construction data memory section 123. The construction data 123a is to be used for constructing a same combination processing section as the combination processing section 125 used for subjecting the most recently input contents to a series of processing.

Subsequently, if it is not the case that the data conversion processing is finished by operation of the user (step S26: No), procedures are repeated from operation of contents reproduction (step S16).

It should be noted that, in the detailed descriptions, completion of OS startup is indicated as an example of "a predetermined event that occurs at a timing before a timing when data to be processed is input" described in summary. However, the predetermined event may be a timing when a certain period is elapsed after completion of the OS startup or may be an operation of a user who instructs construction of the combination processing section.

In addition, in the detailed descriptions, the processing memory section 121 that is built at the hard disc device in accordance with the processing memory section 911 stored in CD-ROM is described as an example of "a processing memory section that stores plural processing sections" described in summary. However, the processing memory section according to the basic embodiment of the present invention may be formed at a hard disc device where filters are previously stored or may be combination of a hard disc device and a CD-ROM.

According to the basic embodiment described above, the same combination processing section as the past combination processing section is built based on the construction data at a timing before data to be processed is input. This shortens the time required until data is offered to a user after the data to be processed is input.

According to the basic embodiment of the data processing apparatus and the data processing program storage medium of the present invention, time between the inputting data to be processed and offering the data to a user is shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although this embodiment(s) of the present invention has(have) been described in detail, it should be understood that the various changes, substitutions, and alterations could be made hereto without departing from the spirit and scope of the invention.

What is claimed is:

1. A data processing apparatus that receives input of data and performs on the input data a series of processing by a combination processing section, the combination processing section being formed by connecting a plurality of processing sections for sharing processing in the order of the processing, the plurality of processing sections having a different combination depending on a kind of data to be input, the data processing apparatus comprising:

a processing memory section that stores a plurality of processing sections for building the combination processing section;

a processing execution section that performs on the input data a series of processing by the combination processing section, the series of processing being in accordance with the input data;

a construction data memory section that stores construction data formed by identification data and connection data for building a same combination processing section as a latest combination processing section that is used by the processing execution section for executing a series of processing of most recently input data, the identification data identifying a plurality of processing sections forming the latest combination processing section, the connection data representing order of processing by the plurality of processing sections; and a processing construction section that reads, in response to a predetermined event that occurs at a timing before a timing when data to be processed is input, a plurality of processing sections forming a same combination processing section as the latest combination processing section, from the construction data memory section based on the construction data stored in the construction data memory section, and that connects the plurality of processing sections in the same order of the processing as in the latest combination processing section, thereby building the same combination processing section as the latest combination processing section, at the same time, in response to input of data to be processed, the processing construction section rebuilding a new combination processing section for executing a series of processing on the data to be processed, when a kind of the data to be processed is different from the kind of the latest data, wherein the processing execution section performs on the data to be processed the series of processing by the combination processing section that is built by the processing construction section.

2. The data processing apparatus according to claim 1, further comprising a message display section that displays a message that it takes time until processing of the data to be processed is started, when construction data is not stored in the construction data memory section.

3. A non-transitory storage medium storing a data processing program that is executed by a computer and that causes the computer to operate as a data processing apparatus, the data processing apparatus receiving input of data and performing on the input data a series of processing by a combination processing section, the combination processing section being formed by connecting a plurality of processing sections for sharing processing in the order of the processing, the plurality of processing sections having a different combination depending on a kind of data to be input, the computer operating as the data processing apparatus comprising:

a processing memory section that stores a plurality of processing sections for building the combination processing section;

a processing execution section that performs on the input data a series of processing by the combination processing section, the series of processing being in accordance with the input data;

a construction data memory section that stores construction data formed by identification data and connection data for building a same combination processing section as a latest combination processing section that is used by the processing execution section for executing a series of processing of most recently input data, the identification data identifying a plurality of processing sections forming the latest combination processing section, the connection data representing order of processing by the plurality of processing sections; and a processing construction section that reads, in response to a predetermined event that occurs at a timing before a timing when data to be processed is input, a plurality of processing sections forming a same combination processing section as the latest combination processing section, from the construction data memory section based on the construction data stored in the construction data memory section, and that connects the plurality of processing sections in the same order of the processing as in the latest combination processing section, thereby building the same combination processing section as the latest combination processing section, at the same time, in response to input of data to be processed, the processing construction section rebuilding a new combination processing section for executing a series of processing on the data to be processed, when a kind of the data to be processed is different from the kind of the latest data, wherein the processing execution section performs on the data to be processed the series of processing by the combination processing section that is built by the processing construction section.

4. The non-transitory storage medium according to claim 3, wherein the data processing apparatus comprises a message display section that displays a message that it takes time until processing of the data to be processed is started, when construction data is not stored in the construction data memory section.

* * * * *